United States Patent [19]
Schubert

[11] Patent Number: 6,029,764
[45] Date of Patent: Feb. 29, 2000

[54] COORDINATED CONTROL OF AN ACTIVE SUSPENSION SYSTEM FOR A WORK VEHICLE

[75] Inventor: William L. Schubert, Downers Grove, Ill.

[73] Assignee: Case Corporation, Racine, Wis.

[21] Appl. No.: 08/968,065

[22] Filed: Nov. 12, 1997

[51] Int. Cl.$^7$ .................................................. B62D 33/08
[52] U.S. Cl. .................................. 180/89.13; 180/89.12; 296/190.07
[58] Field of Search ............................... 180/89.12, 89.13; 296/190.07

[56] References Cited

U.S. PATENT DOCUMENTS

| | | |
|---|---|---|
| 4,753,328 | 6/1988 | Williams et al. . |
| 5,044,455 | 9/1991 | Tecco et al. . |
| 5,291,406 | 3/1994 | Williams et al. . |
| 5,295,074 | 3/1994 | Williams . |
| 5,299,651 | 4/1994 | Wilson . |
| 5,388,811 | 2/1995 | Marjoram . |
| 5,452,209 | 9/1995 | Dinkelacker et al. . |
| 5,579,244 | 11/1996 | Brown . |
| 5,582,385 | 12/1996 | Boyle et al. . |
| 5,603,387 | 2/1997 | Beard et al. . |
| 5,873,581 | 2/1999 | Yale ..................................... 280/5.515 |

FOREIGN PATENT DOCUMENTS

| | | | |
|---|---|---|---|
| 6-107241 | 4/1994 | Japan ................................ | 296/190.07 |
| 6-191444 | 7/1994 | Japan ................................ | 296/190.07 |

OTHER PUBLICATIONS

Active Cab Suspension; by Bjorn Lofgren; Skog Forsk, Results, No. 4, 1995.

*Primary Examiner*—Eric Culbreth
*Attorney, Agent, or Firm*—Foley & Lardner

[57] ABSTRACT

An active suspension system for a work vehicle is disclosed herein. The system includes multiple active vibration isolators mounted between the chassis and cab of the vehicle. Each isolator includes mounts attached to the cab and the chassis, and a spring and a hydraulic actuator are connected between the mounts. The actuator includes a cylinder and a piston moveable therein. The actuator moves the cab relative to the chassis when pressurized hydraulic fluid is selectively supplied and relieved to the actuator by a valve assembly responsive to a valve control signal. The isolator includes a first sensor to measure the displacement between the mounts, and a second sensor to measure movement of the cab due to disturbances in the chassis. The multiple isolators are controlled by a common control circuit which receives the sensed signals and generates the valve control signals to attenuate transmission of force between the cab and the chassis and to control the displacements. The control signals are coordinated with each other to coordinate control of the vibration isolators. The control signals can coordinate control of the displacements, or the attenuation of force, between the isolators. The pressure in air springs supporting the static weight of the cab may also be controlled in a coordinated manner.

20 Claims, 10 Drawing Sheets

| DATA POINT NO. | LONGITUDE | LATITUDE | ALTITUDE (FEET) | BUMPINESS LEVEL |
|---|---|---|---|---|
| 1 | −88.7291520 | 39.0710720 | 800.0 | 1 |
| 2 | −88.7291140 | 39.0710720 | 801.0 | 1 |
| 3 | −88.7290720 | 39.0710740 | 801.0 | 1 |
| 4 | −88.7290320 | 39.0710760 | 800.0 | 1 |
| 5 | −88.7289890 | 39.0710740 | 799.0 | 2 |
| . | . | . | . | . |

COORDINATED CONTROL OF AN ACTIVE SUSPENSION SYSTEM FOR A WORK VEHICLE

FIELD OF THE INVENTION

The present invention relates generally to the field of active suspension systems. More particularly, the invention relates to an active suspension system for a work vehicle including a plurality of active vibration isolators wherein a centralized control circuit generates coordinated control signals for the active vibration isolators to coordinate control of the suspension system.

BACKGROUND OF THE INVENTION

The ride quality and operator comfort of a work vehicle is adversely affected by vibrations or movement transmitted from the frame or chassis of the vehicle to the operator's cab. As the work vehicle travels across a surface, movement of the chassis induces the operator's cab to pitch, roll and bounce. Movement of the cab can be particularly severe in agricultural and construction equipment vehicles (e.g., tractors, combines, backhoes, cranes, dozers, trenchers, skid-steer loaders, etc.) because such vehicles typically operate on off-road surfaces or fields having a high level of bumpiness.

Operator comfort may also be adversely affected by the operation of various systems on a work vehicle. In particular, operation of various work vehicle systems can cause forces to be applied to the chassis of the vehicle which, in turn, are transmitted to the cab. Examples of these forces include the following: draft forces exerted on the hitch of an agricultural tractor by an implement (e.g., a plow) which can cause the cab to pitch; normal forces applied to a work vehicle as the vehicle turns in response to a steering device which can cause the cab to roll; clutch forces generated when a work vehicle clutch (e.g., a main drive clutch; four-wheel drive clutch) is engaged or disengaged which can cause the cab to pitch; gear shift forces generated when a transmission of a work vehicle is shifted which can cause the cab to pitch; braking forces generated as brakes of a work vehicle are operated which can cause the cab to pitch; acceleration forces generated when a speed actuator changes the speed of a work vehicle which can cause the cab to pitch; etc.

The movement of the cab caused by surface bumps and the operation of vehicle systems cause both qualitative and quantitative problems. An operator of such a vehicle experiences increased levels of discomfort and fatigue caused by the vibrations. Productivity is decreased when an operator is forced to rest or shorten the work day, or is unable to efficiently control the work vehicle. The operator is also less likely to be satisfied with a work vehicle which provides poor ride quality. Under certain conditions, the frequency and magnitude of cab movement may force the operator to decrease driving speed, further decreasing productivity.

To improve ride quality and operator comfort, work vehicles have been equipped with passive, semi-active or active suspension systems to isolate the operator from vibrations caused by surface bumps. Such systems include vibration isolators mounted between the chassis and cab or seat. Passive systems use passive vibration isolators (e.g., rubber isolators, springs with friction or viscous dampers) to damp vibrations with different isolators used to damp different frequencies. Rubber isolators may be used, for example, to damp high frequency vibrations and air bags used to damp low frequency vibrations. However, performance of passive systems is limited due to design compromises needed to achieve good control at resonance frequencies and good isolation at high frequencies.

Semi-active systems achieve control and isolation between the chassis and the cab by controlling a damper to selectively remove energy from the system in response to movement of the cab sensed by sensors. Active systems use sensors to sense cab movement and a controller to generate control signals for an actuator which applies a force to the cab to cancel vibrations transmitted to the cab by the chassis. The power needed to apply the force is supplied by an external source (e.g., hydraulic pump).

As the above paragraphs imply, it is desirable that a suspension system attenuate both low and high frequency vibrations between the chassis and cab. Attenuation of high frequency vibrations can decrease acoustic noise in the cab, decrease fatigue and decrease vibration-induced mechanical faults. Attenuation of low frequency (e.g., less than 20 Hz) vibrations can decrease operator fatigue and improve vehicle operability. The attenuation of low frequency vibrations is particularly important because the resonant frequencies of the human body are typically below 20 Hz. For example, the human abdomen resonates at frequencies between 4–8 Hz, the head and eyes resonate at frequencies around 10 Hz, and the torso at 1–2 Hz. The actual frequency may vary with the particular individual.

One active suspension system for a work vehicle includes a hydraulic actuator mounted at a single point between the rear of the cab and the vehicle frame. The front of the cab is pivotally mounted to the frame. The actuator is controlled to move the cab relative to the frame in response to sensed acceleration signals. The system includes a single air bag used to level the cab. This system, however, only affects cab pitch since the actuator can only pivot the cab about the single point. With only a single actuator, this system cannot provide functions which can only be achieved or optimized through coordinated control of multiple vibration isolators.

Another active suspension system for a work vehicle includes one active vibration isolator mounted between the vehicle chassis and the rear of the cab, and two active isolators mounted between the chassis and the front of the cab. Each isolator includes a hydraulic actuator mounted between the chassis and the cab, and an air bag to support the weight of the cab. The actuator is controlled to move the cab relative to the chassis in response to sensed acceleration signals. Each isolator is individually controlled by an electronic controller replicated for each isolator. Thus, the control signals applied to the actuators are not coordinated with each other to provide coordinated control of the isolators.

SUMMARY OF THE INVENTION

Accordingly, the present invention provides an improved active suspension system for a work vehicle. The improved suspension system includes a plurality of active vibration isolators which operate in response to control signals which are coordinated with each other. The control signals may provide coordinated control of the displacements between the cab and the chassis at the locations of the vibration isolators. Thus, the system can control the attitude and vertical movement rate of the cab during power-up and power-down. The system can also adjust the steady-state height of the cab above the chassis, and can lower the cab to a minimum height. The system can also determine the levelness of the cab and adjust the attitude of the cab to maintain the cab level. The control signals may also coordinate the attenuation of force between the cab and the chassis. A digital control circuit including a microprocessor is used. The vibration isolators also include air springs to support the static weight of the cab, and a control circuit which can coordinate the air pressure within the air springs.

One embodiment of the invention relates to an active suspension system for a work vehicle. The work vehicle includes a chassis, a cab, and an actuator power source. The active suspension system includes multiple active vibration isolators mounted at locations between the cab and the chassis. Each isolator includes first and second mounts adapted to attach between the cab and the chassis, an actuator connected between the mounts, an actuator control assembly to selectively apply power from the power source to the actuator in response to an actuator control signal to cause the actuator to move the cab in a given direction relative to the chassis, and a sensor to generate a sensed signal representative of a parameter of actuator motion in the given direction. The system also includes a control circuit configured to generate the plurality of actuator control signals in response to the plurality of sensed signals, wherein the plurality of actuator control signals are coordinated with each other to coordinate control of the active vibration isolators.

Another embodiment of the invention relates to an active suspension system for a work vehicle including a pressurized air source supported by the chassis. Each active isolator includes an air spring connected between the mounts, and an air valve assembly coupled between the pressurized air source and the air spring. The air valve assembly selectively applies pressurized air to the air spring in response to a control signal to cause a change in pressure within the air spring. Each active isolator includes a sensor to generate a signal indicative of a load force exerted by the cab on the isolator. A control circuit generates the air valve control signals in response to the load force signals to control the air pressure in the air springs, wherein the air valve control signals are coordinated with each other.

Another embodiment of the invention relates to an active suspension system for a work vehicle including a chassis, an operator's cab disposed above the chassis, and a pressurized hydraulic fluid source supported by the chassis. The system includes multiple active vibration isolators mounted between the cab and the chassis. Each active isolator includes means for mounting the active isolator between the cab and the chassis, actuator means for moving the cab relative to the chassis in response to a control signal, sensing means for generating a first signal indicative of displacement between the cab and the chassis, and sensing means for generating a second signal indicative of movement of the cab due to disturbances in the chassis. Control means generate the control signals in response to the first and the second signals to attenuate transmission of force between the cab and the chassis and to control the displacements, wherein the control signals are coordinated with each other.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
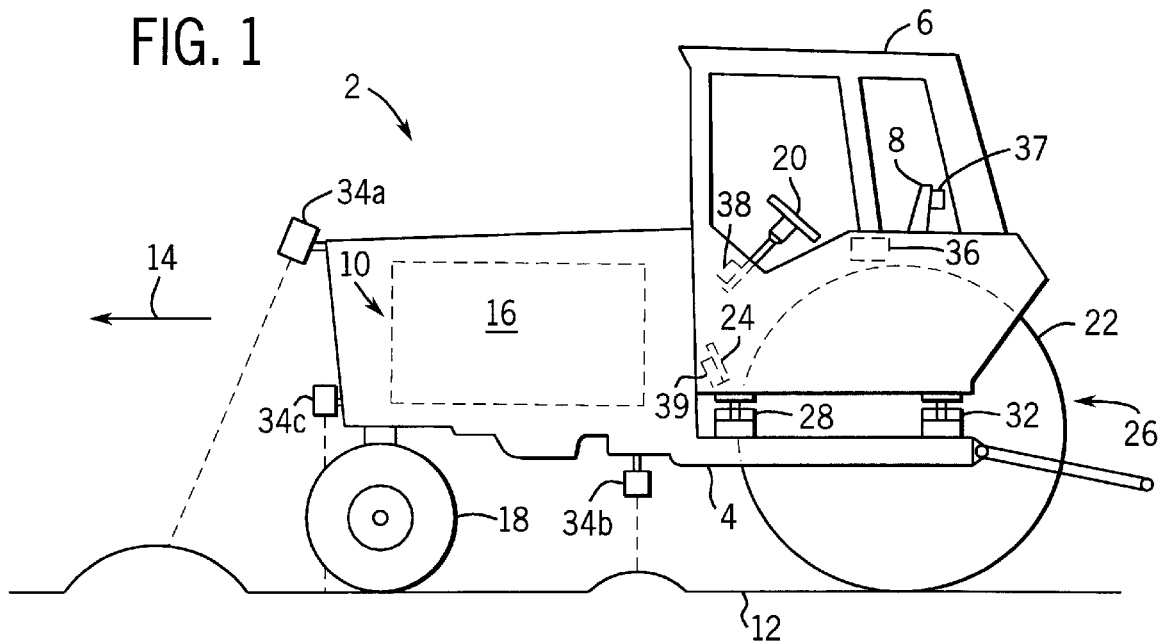
FIG. 1 shows a work vehicle (e.g., an agricultural tractor) equipped with an active cab suspension system which includes two front and one rear active vibration isolators located between the vehicle's cab and chassis.
Figure 2:
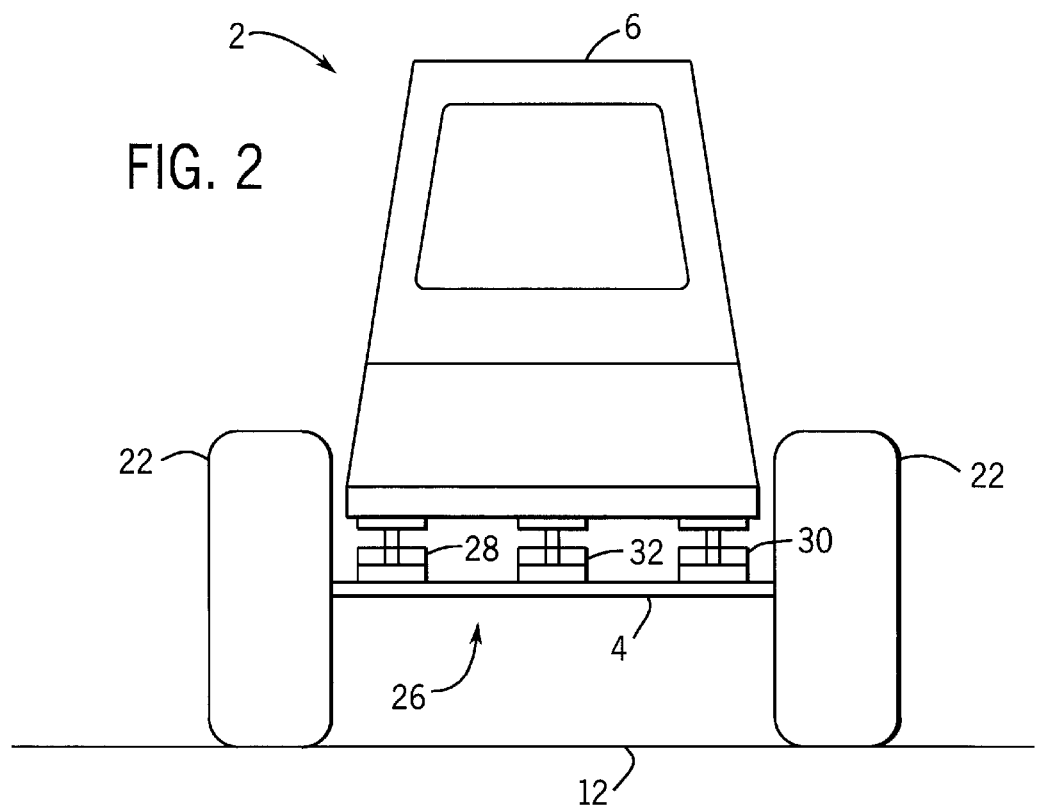
FIG. 2 is a schematic rear view of the work vehicle shown in FIG. 1.

Referring to FIGS. 1 and 2, a work vehicle 2 (e.g., an agricultural tractor) includes a frame or chassis 4, an operator's cab 6 supported above chassis 4, a seat or dual seats 8 within cab 6, and a propulsion system 10 to propel vehicle 2 along a ground surface 12 in a forward direction 14. Propulsion system 10 includes an engine 16 secured to chassis 4, a transmission (not shown) coupled to engine 16, two driven or non-driven front wheels 18 steered by a steering wheel 20, and two rear wheels 22 driven by engine 16 via the transmission. Brake pedals 24 located in cab 6 operate left and right service brakes (not shown) to provide braking. Cab 6 is supported above chassis 4 by an active cab suspension system (ACS) 26 including two front active vibration isolators 28 and 30 located on opposite sides of cab 6 and a rear isolator 32 centrally located at the rear of cab 6 between wheels 22. The three-point suspension system provides stable control of movement responsive to pitch, roll and bounce.

In some work vehicle applications, ACS 26 includes a forward-looking sensor 34a, 34b or 34c mounted to vehicle 2 to detect the bumpiness level on surface 12 forward of vehicle 2. Sensor 34a, 34b or 34c may include a radar to detect bumpiness based on the time needed for electromagnetic signals to travel from sensor 34a, 34b or 34c to surface 12 and be reflected back. However, sensor 34 could also include a vision-based or proximity sensor (e.g., a micropower impulse radar (MIR) device). Sensor 34a, 34b or 34c is mounted to vehicle 2 at a location oriented toward surface 12. For example, the sensor may be mounted on the hood of vehicle 2 (34a), or mounted below vehicle 2 to detect bumpiness forward of rear wheels 22 (34b), or mounted forward of front wheels 18 (34c). The sensed signals represent general levels of bumpiness (e.g., a smooth or rough surface) and are used to adjust performance parameters of isolators 28–32.

In some work vehicle applications, ACS 26 includes a leveling sensor 36 mounted to cab 6 to generate signals indicative of the degree to which the attitude of cab 6 is level relative to horizontal. Leveling sensor 36 may include a gyroscope or electronic level signal generator, and sensor 36 may be mounted at the center of gravity of cab 6. The signal from sensor 36 can be used to control the attitude of cab 6 and to maintain a level attitude.

ACS 26 may further include a movement sensor 37 (e.g., a three-axis accelerometer) mounted adjacent to an operator's torso or head (e.g., supported by a headrest of seat 8) to accurately sense the movement felt by the operator. The signal from sensor 37 is used as a primary or secondary control input to more accurately control the movement of cab 6 and its affect on the operator. ACS 26 may also include several accelerometers mounted to cab 6. These signals are combined to form a control input.

Components of other vehicle systems within cab 6 may include a steering angle sensor 38 coupled to wheel 20 to generate a signal representing steering angle, and brake detecting circuits 39 coupled to brake pedals 24 to detect application of the service brakes. Circuits 39 can also be coupled directly to the brakes. The signals generated by sensor 38 and circuits 39 are supplemental control inputs used by ACS 26 to counteract movement of cab 6 due to forces applied to chassis 4 when turning or braking, or are used as preparatory signals (e.g., to bias the hydraulic fluid supply toward the particular isolator which will require the fluid).

As explained below, ACS 26 attenuates transmission of vibrations between chassis 4 and cab 6 caused by the interaction of wheels 18 and 22 with surface 12, or due to forces applied to vehicle 2 during operation of other vehicle systems such as the steering, transmission and braking systems. Each isolator 28–32 can be controlled separately, or coordinated with each other to improve vibration isolation and to provide additional functions. Coordinated control of isolators 28–32 can provide improved response to pitch, roll and bounce forces applied to cab 6. Performance parameters of ACS 26 are adjustable in response to estimated conditions ahead of vehicle 2, or to changes in load. The gain, and thus the frequency response, of ACS 26 is set to maximize the vibration isolation of ACS 26 without exceeding the mechanical limits (i.e., actuator stroke) of the system. The gain can further be tuned manually to account for differences among the frequency response of individual operators.

Although a tractor is shown in FIGS. 1 and 2, ACS 26 may be used with other agricultural work vehicles such as combines or cotton-pickers or with construction vehicles such as backhoes, cranes, dozers, trenchers, skid-steer loaders, etc. These vehicles may be equipped with either wheeled or tracked propulsion systems. Other arrangements of ACS 26 can be used in these vehicles such as a three-point active suspension system including one front and two rear isolators or a four-point system with two front and two rear isolators. Further, one or more active vibration isolators 28–32 can be mounted between cab 6 and seat 8 in an active seat suspension system.

Figure 3:
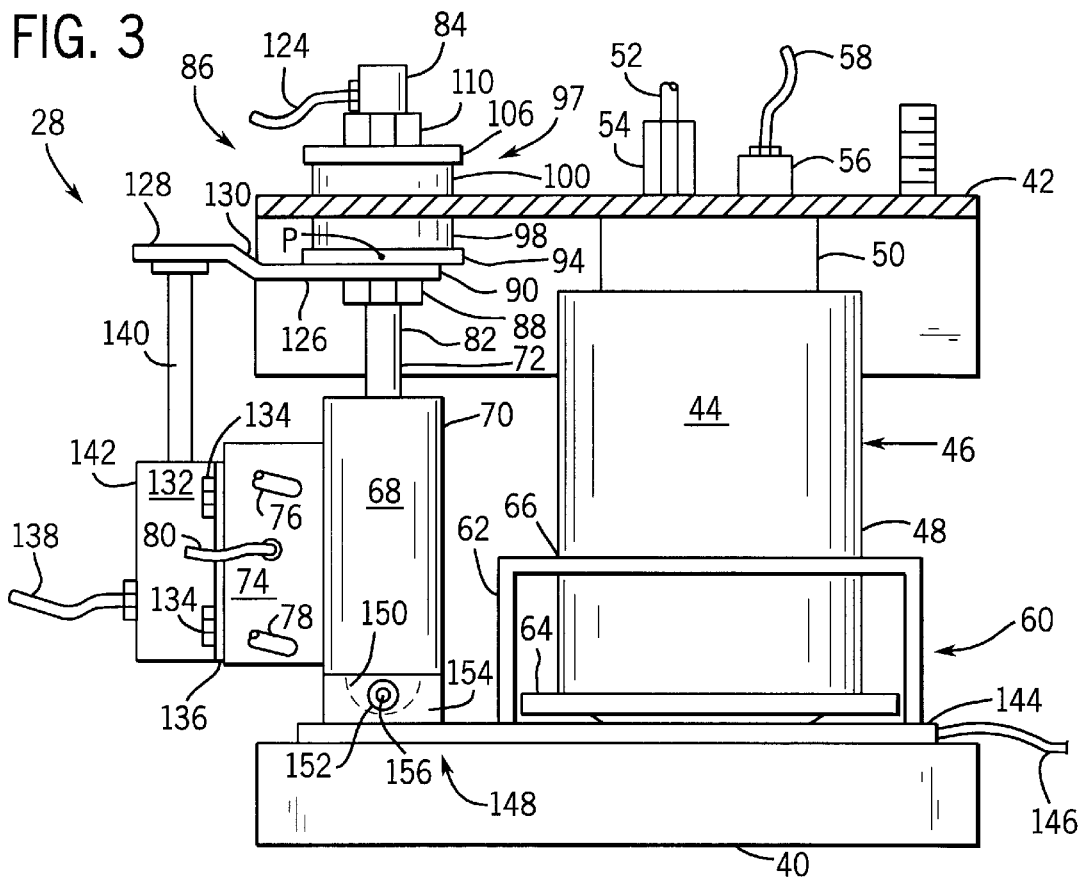
FIG. 3 is a view from the side of the work vehicle of one of the front active vibration isolators which includes electrical interfaces to an accelerometer, a displacement sensor, a load sensor, a pressure sensor and a hydraulic actuator, a hydraulic interface to the actuator, and a pneumatic interface to an air spring.

Referring to FIG. 3, front active vibration isolator 28, which is substantially the same as front isolator 30, includes lower and upper mounts 40 and 42, respectively, which are attached to chassis 4 and cab 6, respectively, by welding, screws, bolts or other fasteners. A spring 44 including an air bag is connected between mounts 40 and 42 to support the static weight of cab 6. Spring 44 includes an enclosure 46 comprising a cylindrical outer casing 48 attached (e.g., welded) to lower mount 40 and a cylindrical inner casing 50 attached to upper mount 42 and extending into outer casing 48. The air bag (not visible) is secured within enclosure 46. The air bag is inflated with pressurized air through a supply tube 52 and a pneumatic fitting 54 to a pressure sufficient to support the static weight of cab 6 so as to off-load the weight from other components of isolator 28.

In some work vehicle applications, the air pressure in springs 44 is set at a constant level to support the static weight of cab 6, and the pressure is not adjusted to account for changes in load of cab 6 on isolators 28–32. In such applications, a pneumatic system is charged with pressurized air supplied to spring 44 through tube 52. The pressure of the air supplied to spring 44 is set or regulated at or slightly below the pressure needed to raise cab 6. Solenoid-controlled valves turn on the flow of air to isolators 28–32. Such systems may be pressurized off-line so the vehicle does not require an on-board air compressor. Alternatively, air pressure in such pneumatic systems may be maintained by an on-board air compressor to replace air lost to leaks. This type of system does not actively control air pressure, and does not respond to changes in the weight of cab 6.

However, in other work vehicle applications, ACS 26 actively controls the air pressure within springs 44. As described below, such systems include air control valves to selectively supply and relieve pressurized air from a source (e.g., a compressor and/or high pressure air tank) to springs 44 in response to control signals generated based on, for example, load forces exerted on springs 44 by cab 6. The compressed air source provides the ability to actively control pressure during operation of vehicle 2. To improve accuracy in controlling pressure, the pressure in springs 44 may be monitored using a pressure sensor 56 mounted to upper mount 42 and configured to generate closed-loop pressure feedback signals on conductors 58.

Isolator 28 includes a rollover restraint system 60 to prevent cab 6 from detaching from chassis 4 during a rollover. Restraint system 60 includes a rollover frame 62 secured (e.g., welded) to lower mount 40 which is able to cooperate with a plate 64 secured to outer casing 48. Frame 62 includes a circular hole 66 having a diameter slightly larger than that of casing 48 but less than that of plate 64. In the event of a rollover causing casing 48 to separate from lower mount 40, casing 48 can slide upward within hole 66 until plate 64 makes contact with frame 62. Thus, movement of cab 6 caused by a rollover is restrained and cab 6 does not detach from chassis 4.

Connected adjacent to spring 44 between mounts 40 and 42 is a linear hydraulic actuator 68. Actuator 68 includes a cylinder 70 and a piston or rod 72 moveable therein to move cab 6 relative to chassis 4. A valve assembly 74 coupled to cylinder 70 selectively supplies and relieves pressurized hydraulic fluid between a pair of tubes 76 and 78 and cylinder 70 in response to valve control signals received on conductors 80. Thus, piston 72 moves in either direction along the axis of cylinder 70 in response to the control signals. Preferably, the control signals are pulse-width modulated (PWM) control signals and valve assembly 74 is a four-way, three-position electrically-controlled solenoid valve.

Figure 4:
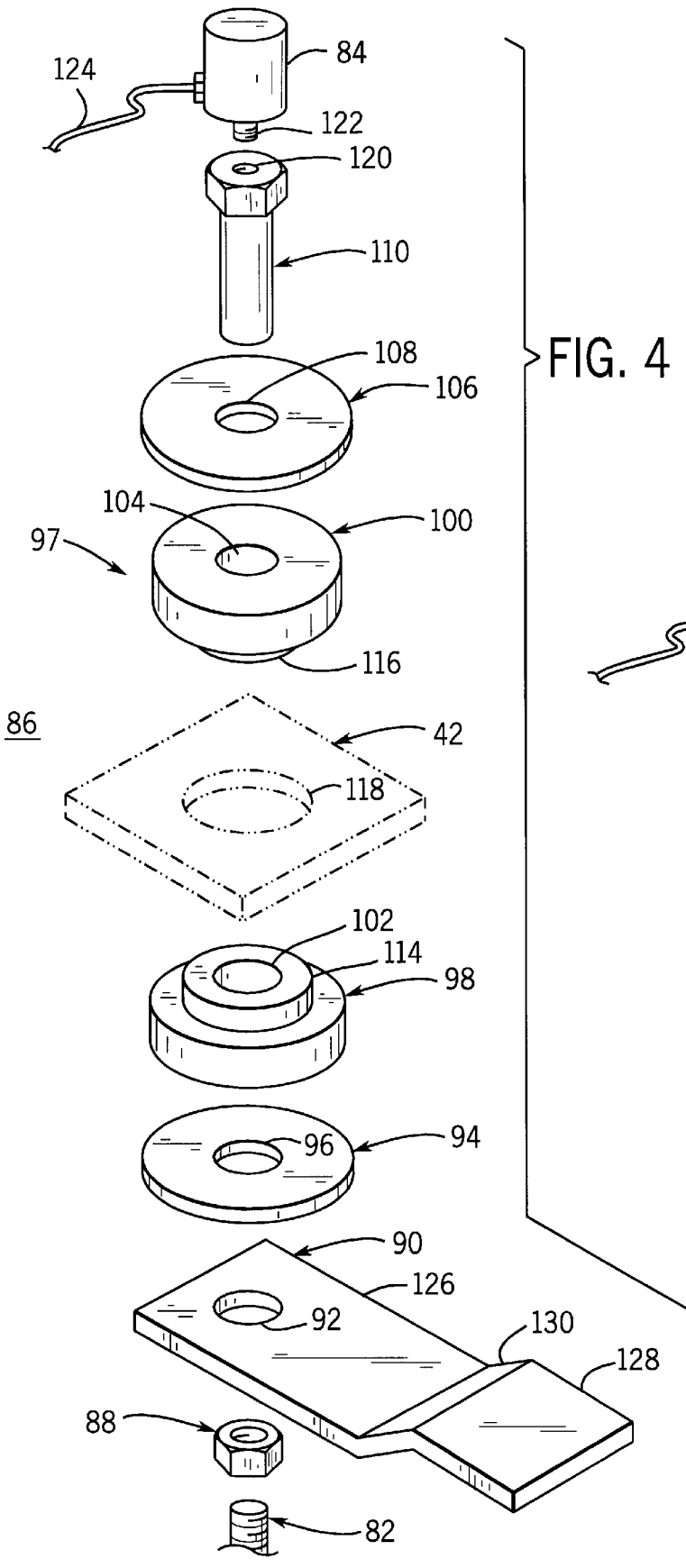
FIG. 4 is an exploded view of the accelerometer mounting assembly shown assembled in FIG. 3.
Figure 5:
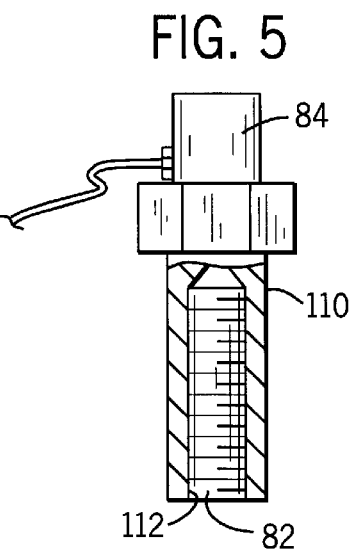
FIG. 5 is a partially broken away view of the coupling between the accelerometer and the actuator's piston.

Referring to FIGS. 3–5, a threaded free end 82 of piston 72 extends through upper mount 42 and is coupled to a movement sensor 84 via a mounting assembly 86 which provides high-frequency isolation of sensor 84 from mount 42. In upward order, assembly 86 includes an internally-threaded rod nut 88 for receiving end 82, a potentiometer target bracket 90 having an aperture 92, a lower hardened washer 94 having an aperture 96, an elastomeric vibration isolator 97 having lower and upper isolator portions 98 and 100 located on opposite sides of upper mount 42 and having apertures 102 and 104, an upper hardened washer 106 having an aperture 108, and a bolt/sleeve 110 having a threaded bore 112 to securely receive free end 82 of piston 72. Isolator portions 98 and 100 include inner annular portions 114 and 116, respectively, which pass through an aperture 118 in mount 42. The components of assembly 86 are coaxially aligned such that piston 72 passes through nut 88, apertures 92, 96, 102, 118, 104 and 108 and bore 112. Thus, elastomeric vibration isolator 97 physically separates upper mount 42 from piston 72 to provide high-frequency isolation.

Bolt/sleeve 110 includes a tapped hole 120 coaxial to piston 72 to receive a threaded post 122 of movement sensor 84, thereby securely mounting sensor 84 to piston 72. Sensor 84 generates an electrical signal on conductors 124 which represents movement of piston 72 in a direction along the axis of piston 72 at a point P (e.g., at washer 94) lying between actuator 68 and elastomeric isolator 97. Thus, isolator 97 provides high-frequency isolation between upper mount 42 and movement sensor 84. Sensor 84 preferably includes an accelerometer. During operation, valve control signals generated in response to the signals from sensor 84 are applied to actuator 68 to move cab 6 to counteract the movement of chassis 4. Post 122 can alternatively be secured directly to a bore in end 82 of piston 72.

Potentiometer target bracket 90 includes first and second flat portions 126 and 128 and a rising portion 130 extending from portion 126 to 128. A displacement sensor 132 (e.g., potentiometer; inductive sensor) is adjustable secured by bolts 134 to a track 136 running along valve assembly 74. Sensor 132 generates electrical signals on conductors 138 representing the distance that actuator shaft 140 extends from casing 142. This distance is indicative of the displacement between mounts 40 and 42. The displacement signal from sensor 132 is used to bias piston 72 to a centered steady-state position so as to prevent migration to either end of cylinder 70 over time, and to control the height of cab 6 above chassis 4.

Vibration isolator 28 may also include a load sensor 144 which generates electrical signals on conductors 146 representing load forces exerted by cab 6 on chassis 4. The load forces can be used to adjust air pressure within spring 44 to account for changes in weight of cab 6. For example, changes in the weight of an operator, or changes due to having two people in cab 6, can be accommodated.

To accommodate translational movement between chassis 4 and cab 6, a spherical bearing assembly 148 is provided between cylinder 68 and lower mount 40. Assembly 148 includes a bearing eye 150 which extends down from cylinder 68 and encompasses a spherical bearing 152. Eye 150 fits into a slot within a bearing block 154 mounted to lower mount 40, and is held in place by a crosspin 156 inserted through an aperture in block 154 and bearing 152. Assembly 148 allows relative movement of cylinder 68 about the axis of bearing 152.

Although FIG. 3 shows actuator 68 adjacent to spring 44, actuator 68 and spring 44 may be coaxially located as shown in U.S. Pat. No. 5,603,387, herein incorporated by reference in its entirety.

Figure 6:
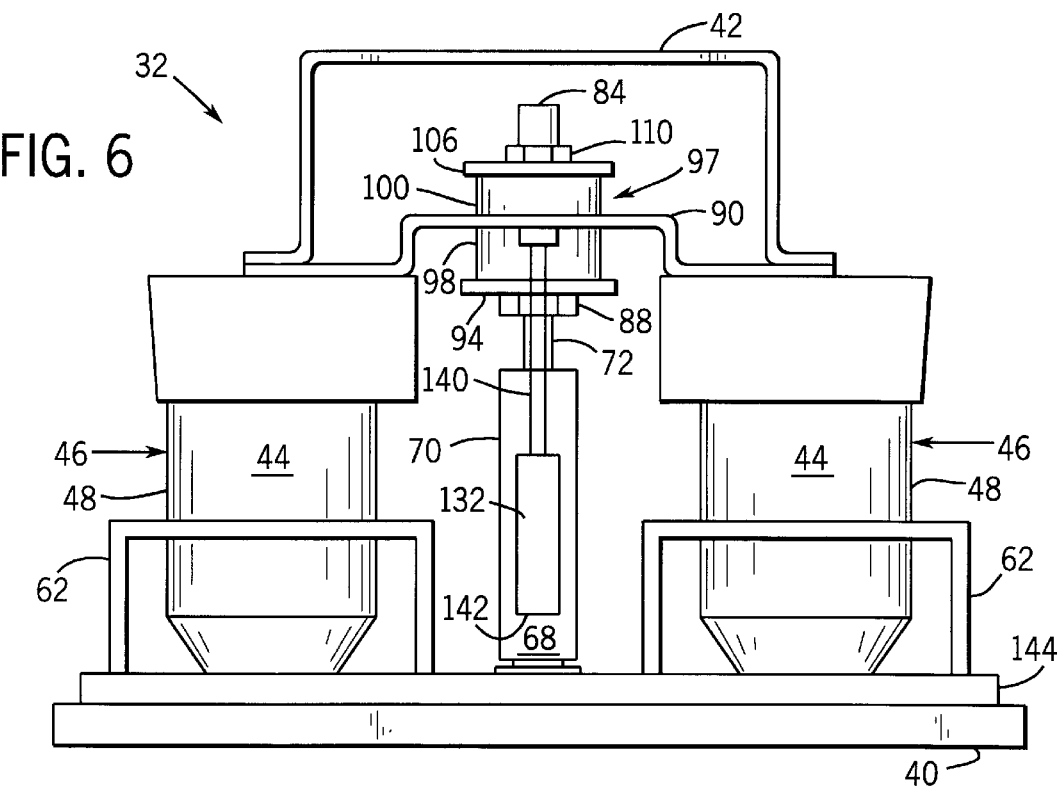
FIG. 6 is a view from the rear of the work vehicle of the rear active vibration isolator which includes two springs to support the weight at the rear suspension point.

Referring to FIG. 6, rear isolator 32 is similar to front isolator 28 except that rear isolator 32 includes a second spring 44 to off-load the higher static weight of cab 6 on rear isolator 32. Off-loading may be necessary to avoid exceeding the weight capacity of a single air bag. However, a second spring may not be needed if ACS 26 includes four active isolators, or if the cab weight does not exceed the capacity of a single air bag. Other differences between rear isolator 32 and front isolator 28 include the shapes of potentiometer target bracket 90 and of upper mount 42 (which both extend between springs 44), and the coupling of elastomeric vibration isolator 97 to bracket 90 instead of to upper mount 42. Sensor 132 is mounted on or within cylinder 70 such that sensor 132 and cylinder 70 are co-linear.

Figure 7:
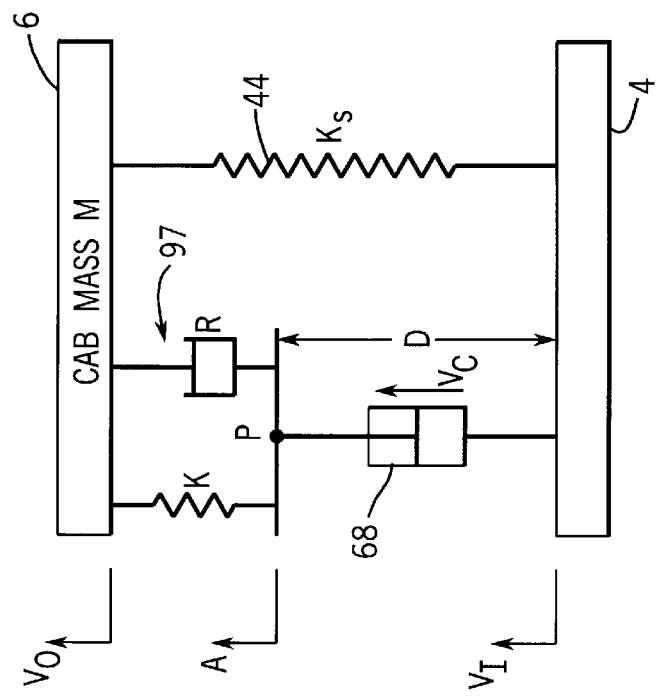
FIG. 7 is a mechanical schematic of the active vibration isolator shown in FIG. 3.

Referring to FIG. 7, each vibration isolator 28–32 is represented by a mechanical schematic showing spring 44 connected between cab 6 and chassis 4, actuator 68 connected between chassis 4 and point P (e.g., at washer 94), and elastomeric vibration isolator 97 in series with actuator 68 between point P and cab 6. Actuator 68 provides low frequency (e.g., below 20 Hz) isolation between chassis 4 and point P. Isolator 97 provides high frequency (e.g., above 20 Hz) isolation between point P and cab 6. Thus, cab 6 is isolated from chassis 4 for both high and low frequency movement or vibrations.

Each individual active vibration isolator 28–32 has characteristics defined by the mass M of cab 6 supported by the isolator, the stiffness $K_S$ of spring 44, the input velocity $V_C$ of actuator 68, and stiffness K and damping coefficient R of isolator 97. Stiffness $K_S$ of spring 44 affects only the power consumption of actuator 68 and does not affect idealized isolation. The quantity being actively controlled is input velocity $V_C$ of actuator 68.

Figure 8:
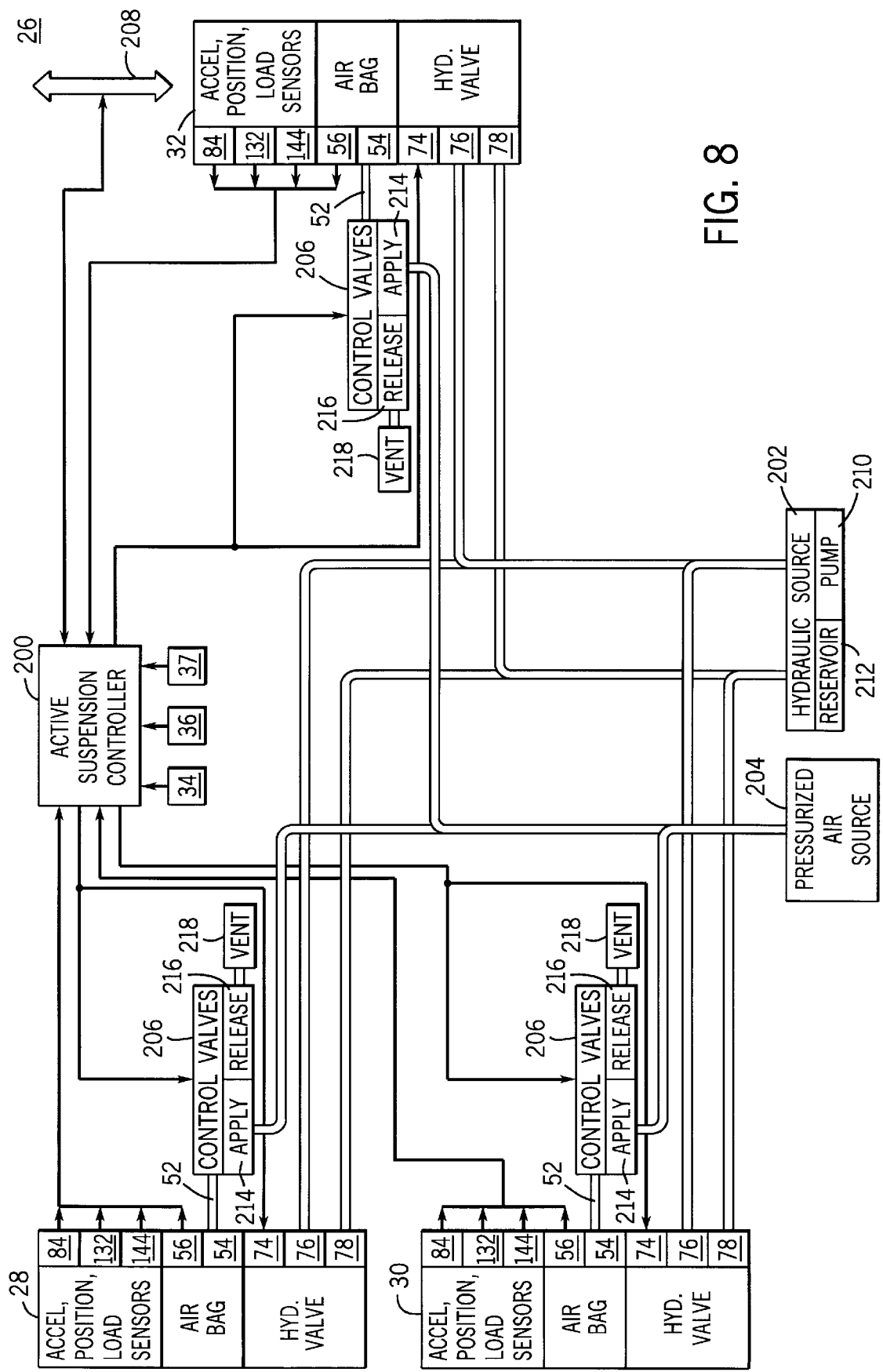
FIG. 8 is a schematic diagram of the active cab suspension system in FIG. 1 including connections between the electrical, hydraulic and pneumatic interfaces of the active vibration isolators and a controller, pressurized hydraulic fluid source and pressurized air source.

Referring to FIG. 8, ACS 26 includes front isolators 28 and 30, rear isolator 32, an active suspension system controller (ASC) 200, a source of pressurized hydraulic fluid 202, a pressurized air source 204, an air control valve 206 for each isolator 28–32, and a vehicle data bus 208. ASC 200 is connected by electrical conductors to movement sensor 84, displacement sensor 132, load sensor 144, air pressure sensor 56, valve assembly 74, and air control valve 206 of each isolator 28–32, and to bump sensor 34, leveling sensor 36, and movement sensor 37. ASC 200 receives signals from each sensor and generates output signals in response thereto which are applied to valves 74 and 206. ASC 200 further communicates to and from other vehicle systems via bus 208. Preferably, bus 208 conforms to the SAE J-1939 standard for vehicle data busses entitled "Recommended Practice for a Serial Control and Communications Vehicle Network".

Pressurized hydraulic fluid source 202 includes an engine-driven pump 210 to supply pressurized hydraulic fluid to isolators 28–32 via tubes 76 under the control of valve assemblies 74. Valve assemblies 74 also control release of fluid from isolators 28–32. Released fluid is returned to a reservoir 212 of source 202 via tubes 78.

When pressure in springs 44 is actively controlled, each air control valve 206 includes an apply valve 214 which receives a flow of pressurized air from source 204 (e.g., a compressor) and selectively applies the flow to spring 44 of each isolator 28–32 in response to control signals generated by ASC 200. Each valve 206 includes a release valve 216 to selectively release air from the air bag to a vent 218 in response to the air control signals. The pressure within each air bag increases up to the maximum pressure of source 204 when the apply valve 214 is open, and decreases when release valve 216 is open. The air control signals may include PWM signals.

Figure 9:
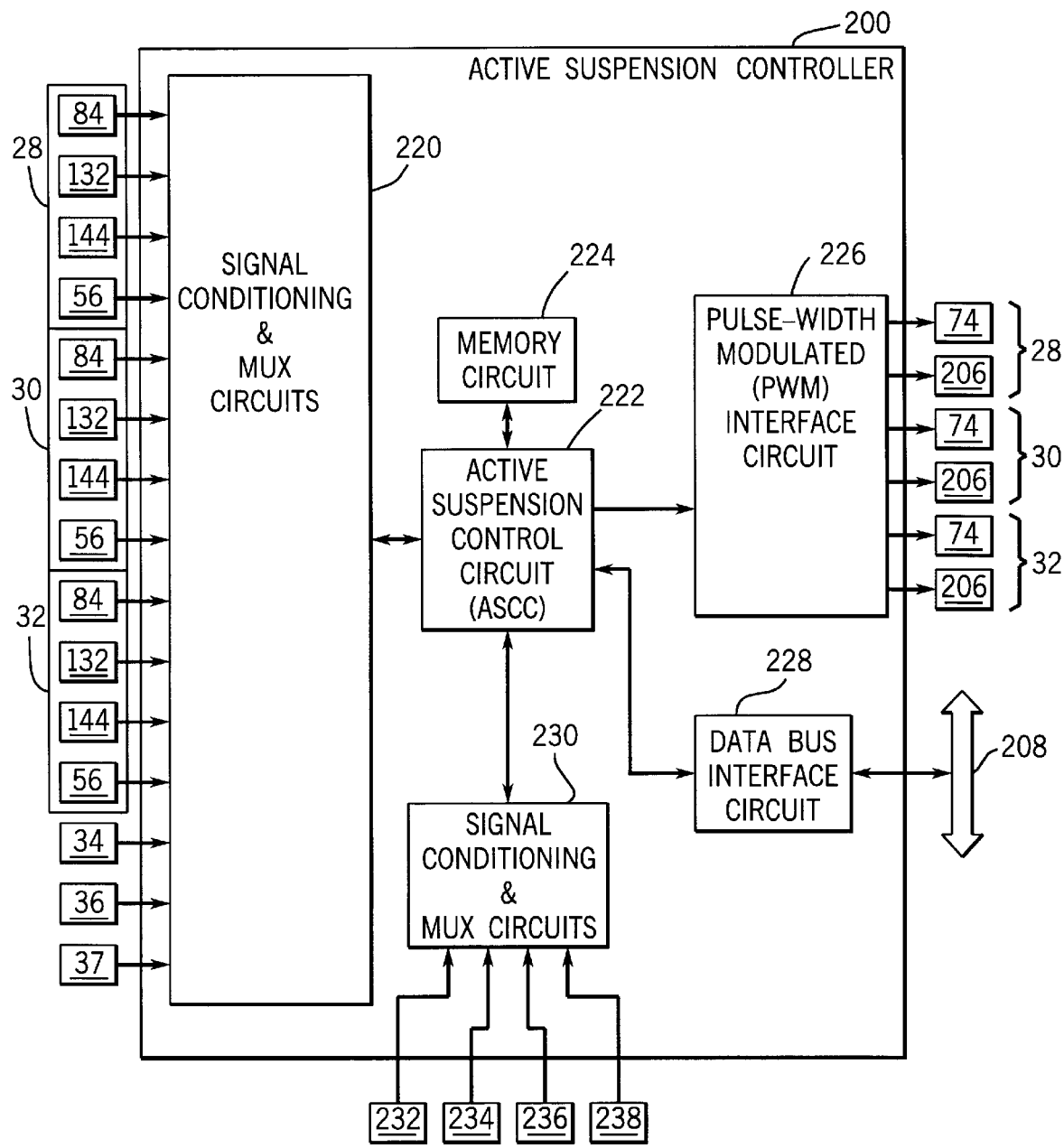
FIG. 9 is a schematic block diagram of the active suspension controller of FIG. 8 which includes a data bus interface for communicating with other vehicle systems.

Referring to FIG. 9, ASC 200 includes a signal conditioning/multiplexer circuit 220 to receive signals from sensors 84, 132, 144 and 56 of each isolator 28–32 and from sensors 34, 36 and 37. ASC 200 further includes an active suspension control circuit (ASCC) 222 coupled to circuit 220, a memory circuit 224 accessible to ASCC 222, an interface circuit 226 to generate control signals (e.g., PWM signals) to valve assembly 74 and air control valve 206 associated with each isolator 28–32, and a data bus interface circuit 228 configured to communicate with other vehicle systems across bus 208.

Circuit 220 includes signal conditioning hardware (e.g., filters), multiplexers and A/D interface circuits. ASCC 222 includes a digital processor (e.g., a 16-bit microprocessor) which may include software conditioning such as digital filtering or averaging. Memory circuit 224 includes non-volatile memory (ROM, EEPROM or FLASH) for storing programs and volatile memory (RAM) for storing variables. Dedicated, specific purpose equipment or hard-wired logic circuitry can also be used. PWM interface circuit 226 generates PWM control signals based upon digital words written to circuit 226 by ASCC 222.

Interface circuit 228 formats input and output bus messages which conform to the J-1939 standard protocol.

ASC 200 includes an operator interface circuit to receive command signals from operator-actuatable command devices and control operation of ACS 26. The interface includes a signal conditioning/multiplexer circuit 230 (which may be the same as circuit 220) which receives signals from command devices 232–238. Devices 232–238 include any or all of: a cab rate command device 232 (e.g., potentiometer) to set a rate at which cab 6 moves during power-up/power-down; a cab height command device 234 (e.g., potentiometer) to set a steady-state height of cab 6 above chassis 4; a cab lower command device 236 (e.g., switch) to command cab 6 to a minimum height; and a tuning device 238 (e.g., potentiometer) to tune the gain, and thus the frequency response, of ACS 26.

Figure 10:
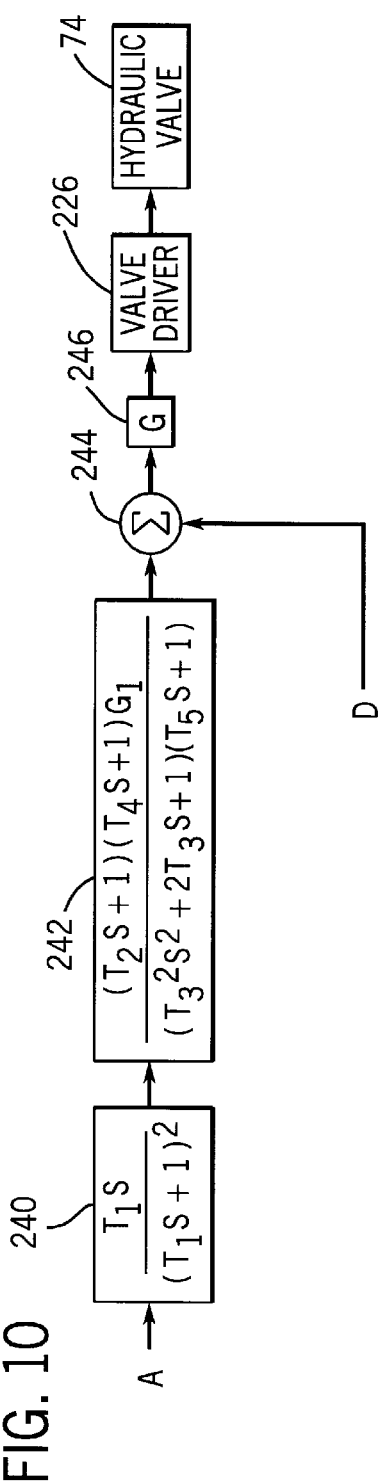
FIG. 10 is a process flow control diagram for the hydraulic actuator of each active vibration isolator.

Referring to FIG. 10, ASC 200 generates the valve control signals applied to actuator 68 via conductors 80 for each active vibration isolator 28–32. The control signals may be generated individually for each isolator 28–32 using the process shown in FIG. 10. The inputs to the process are displacement signal D (FIG. 7) sensed by sensor 132, and acceleration signal A (FIG. 7) sensed by sensor 84. A first network 240 having the shown transfer characteristics removes a DC component of signal A caused by the acceleration of gravity and integrates signal A to generate a signal representing absolute velocity at point P (FIG. 7). A second network 242 provides dynamics to isolate lower vibration frequencies (e.g., below 20 Hz) with desired stability and performance characteristics. Second network 242 can be tuned to the resonant frequency of chassis 4, or to a frequency selected by the operator. A summing circuit 244 sums the output from network 242 with signal D to produce a combined signal representing both the velocity of chassis 4 to be counteracted and the displacement of piston 72. Signal D causes piston 72 to return to a centered steady-state position to prevent the migration of piston 72 to either end of cylinder 70 over time. A gain circuit 246 amplifies the summed signal and applies the amplified signal to PWM interface circuit 226 to generate the valve control signals applied to hydraulic valve 74. Valve 74 responds by selectively supplying and relieving hydraulic fluid to each actuator 68 to cause each piston 72 to move cab 6 relative to chassis 4.

Thus, the transmissibility of each isolator 28–32 is defined by the equation:

$$V_I/V_J = 1/(1+G)*((R/M)s+K/M)/(s^2+(K/M)s+K/M)$$

wherein G is the gain (e.g., 100) of circuit 246 relating input velocity $V_C$ of actuator 68 with the velocity at point P, $V_O$ is the velocity of cab 6 (FIG. 7), $V_I$ is the velocity of chassis 4 (FIG. 7), R and K are the damping coefficient and stiffness of elastomeric isolator 97, and M is the mass of cab 6 being supported. The gain G of circuit 246 may be adjusted manually by an input device such as a potentiometer (not shown), or automatically as described below. Stiffness $K_S$ of spring 44 does not affect transmissibility because spring 44 only off-loads the static weight of cab 6 to reduce power consumption.

In work vehicle applications wherein air pressure within air springs 44 is actively controlled, ASC 200 generates the control signals applied to the air control valve 206 of each isolator 28–32 to selectively supply and relieve pressurized air to the air bags. The control signals control the air pressure within springs 44 in response to load signals generated by load sensors 144. The pressure within springs 44 is controlled to support the static weight of cab 6 on each isolator 28–32. Thus, changes in weight of cab 6 at each support position are accommodated by changes in pressure within each spring 44. Closed-loop pressure control can be provided using pressure signals from sensors 56 as feedback signals.

The control process shown in FIG. 10 and the active control of pressure within springs 44 can be modified to adjust performance parameters of ACS 26. The adjustable parameters include, for example, the gain and frequency response of isolators 28–32, and the gain at which the displacement signal from sensor 132 biases piston 72 to the steady-state position to prevent migration of piston 72 to either end of cylinder 70 over time. The gain of isolators 28–32 is adjusted by changing gain G of circuit. 246, or the gain of network 240 or 242 (e.g., gain $G_1$). The frequency response is adjusted by modifying the transfer function of network 242. The gain at which piston 72 is biased is adjusted by changing the impact of signal D in the control process of FIG. 10. For example, the impact is changed by adjusting the weight of signal D in the combined signal output by summing circuit 244. As discussed above, the pressure within springs 44 is also an adjustable parameter which can be actively controlled.

The primary control inputs for ACS 26 include the acceleration signal A and displacement signal D. The system is set to provide maximum gain without exceeding the stroke of actuators 68. However, the gain may then be adjusted based on secondary or supplemental control inputs such as estimated conditions or signals from other vehicle systems. One supplemental input used to adjust the performance parameters of ACS 26 is the estimated condition of surface 12 forward of vehicle 2. Adaptive or predictive control algorithms respond to the estimated condition to improve performance. For example, the performance parameters may be adjusted based upon the estimated bumpiness of surface 12 ahead of vehicle 2. Bumpiness may be estimated by processing (e.g., taking a root-mean-square of) the signals from bump sensor 34a, 34b or 34c. Alternatively, the bumpiness level can be estimated from the previous level of movement sensed by movement sensor 84 based upon the assumption that surface 12 forward of vehicle 2 will have a similar bumpiness level as surface 12 behind vehicle 2.

The bumpiness level can also be estimated based upon the assumptions that vehicle 2 travels quickly on roads and slowly in fields, and that roads are smooth while fields are bumpy. The level is estimated by comparing ground speed of vehicle 2 to a predetermined threshold speed (e.g., 10 mph). High velocities correspond to a smooth bumpiness level, while low velocities correspond to a rough bumpiness level. Other methods of estimating bumpiness based upon the positions of vehicle 2 and geo-referenced maps of surface 12 ate described below.

When the estimated signals represent a bumpiness level, the valve control signals applied to actuator 68 attenuate movement of cab 6 due to movement of chassis 4 in response to the bumpiness level by adjusting the gain of ACS 26. If surface 12 has a high bumpiness level, ASC 200 lowers the gain G of circuit 246 such that piston 72 is not commanded beyond its maximum stroke. However, if surface 12 has a low bumpiness level, ASC 200 raises the gain G to increase isolation provided by isolators 28–32. The degree at which gain is adjusted may depend upon the level of bumpiness if there are more than two levels.

The gain at which the sensed displacement causes cab 6 to move toward the centered steady-state position can be decreased when surface 12 is relatively bumpy to help insure that piston 72 has sufficient stroke to respond to the bumps as they occur. This gain may be increased when surface 12 is smooth to provide a smoother ride. Also, the frequency response of isolators 28–32 may be changed based on estimated bumpiness if empirical tests indicate that such an adjustment would increase ride quality. The frequency response may also be adjusted manually by the operator using signals from tuning device 238.

ASC 200 can control each active vibration isolator 28–32 independently. Independent control, however, does not provide functions which are achieved or optimized only through coordinated control. Thus, the valve control signals applied to actuators 68 and air control signals applied to air control valves 206 are coordinated with each other to coordinate control of isolators 28–32.

In some work vehicle applications, the valve control signals applied to actuators 68 are coordinated with each other to coordinate control of the displacements between chassis 4 and cab 6 at the locations of isolators 28–32. A benefit of coordinating the displacements can be seen, for example, during power-up and power-down of vehicle 2.

Assume that actuator 68 of each isolator 28–32 is controlled using an independent controller. At power-up, the static weight of cab 6 is just supported by springs 44 and pistons 72 are in their power-down positions (eg., maximum downward or retracted positions). Then, as each independent controller enters an actuator control loop after completing initialization logic (e.g., built-in tests), the valve control signals cause each actuator 68 to raise cab 6 until each respective piston 72 reaches an operating position (e.g., its centered steady-state position). Each actuator 68 will raise cab 6 with random timing and rates compared to other actuators 68 due to differences in timing for each controller to enter its actuator control loop, and differences in timing for the vehicle hydraulic system to provide pressurized hydraulic fluid to each actuator 68. The random timing and rates with which cab 6 is raised on power-up causes jerking and uneven cab attitudes which are felt by the operator. A similar problem occurs during power-down of vehicle 2.

In response to these problems, ASC 200 coordinates control signals applied to each isolator 28–32 to control the attitude and movement rate of cab 6 during power-up and power-down. At power-up, ASC 200 performs built-in tests and other initialization functions. Then, ASC 200 raises cab 6 to a steady-state height while maintaining cab 6 at a substantially constant or level attitude by coordinating the command signals applied to valves 74 and using sensed displacement signals as closed-loop feedback signals. Equalized commands are simultaneously applied to valves 74 to extend each piston 72 from its power-down position to its steady-state position at a predetermined rate. The rate can be fixed, or can be manually set by cab rate command device 232. To insure availability of sufficient hydraulic power to each isolator 28–32, ASC 200 delays extending pistons 72 until a sufficient time has passed following power-up. Alternatively, ASC 200 can monitor the displacement of each isolator 28–32 and set the command signals to extend pistons 72 no faster than the movement of the slowest isolator 28–32. Thus, no isolator is raised faster than another isolator which may lag due to insufficient hydraulic power. Closed-loop displacement control is also performed during power-down.

Figure 12:
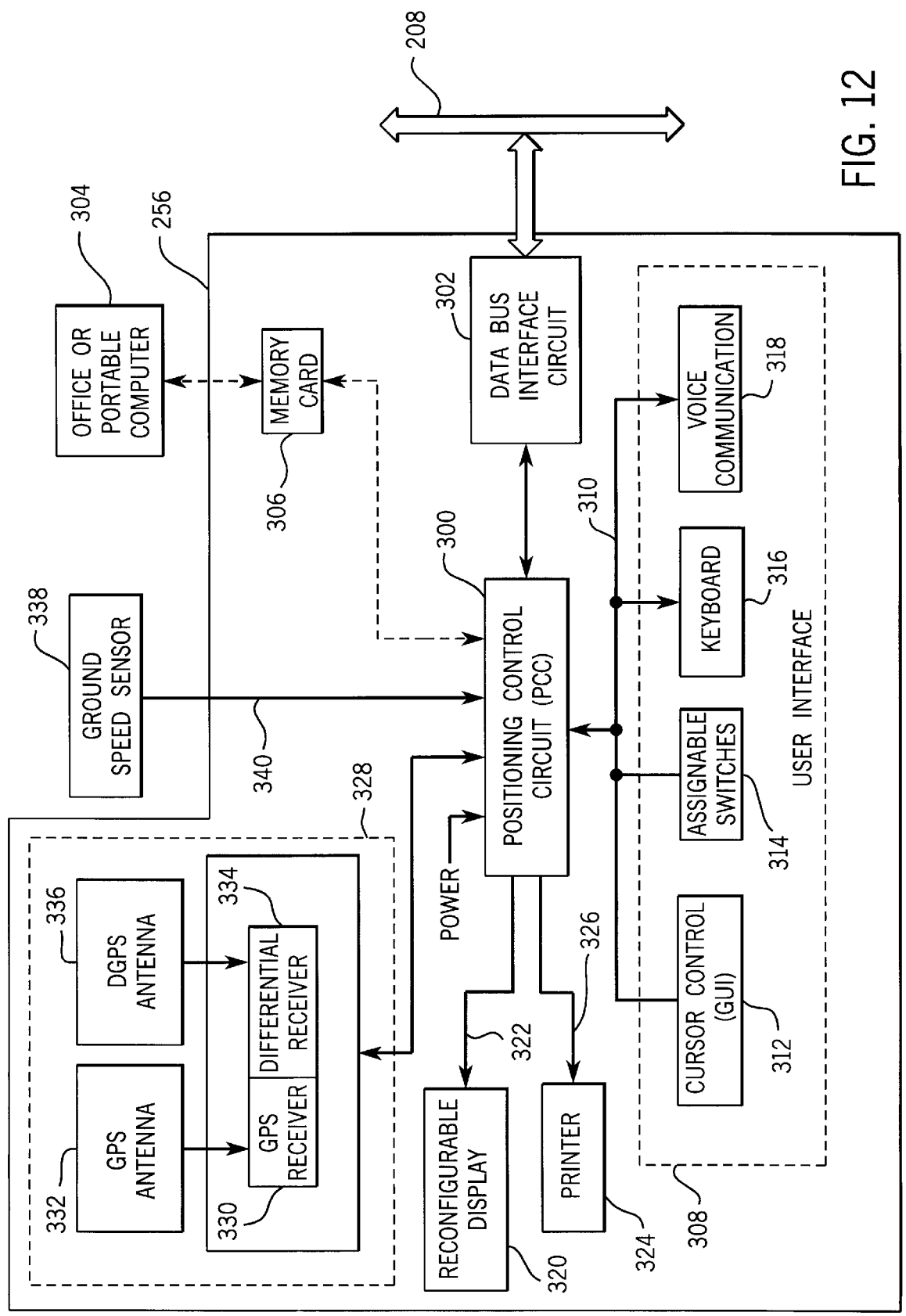
FIG. 12 is a block diagram of the positioning control system in FIG. 11 which includes a GPS receiver, memory card interface, and positioning control circuit.

In one embodiment, ASC 200 includes control logic which prevents cab 6 from being actively moved relative to chassis 4 when vehicle 2 is not moving (i.e., ground velocity less than a predetermined speed threshold) or when an operator-presence sensor indicates the operator is not present. For example, ASC 200 does not raise cab 6 to its steady-state height until vehicle speed exceeds a threshold. Gating the valve control signals with movement of vehicle 2 prevents the unexpected movement of cab 6 when a person outside cab 6 is nearby. Vehicle speed can be sensed using sensor 338 (FIG. 12).

Another benefit of coordinating the displacements is the ability to control the attitude of cab 6, either with respect to the horizontal (i.e., horizon) or with respect to chassis 4. For example, to maintain a level attitude of cab 6 with respect to chassis 4, displacement signals from each sensor 132 can be combined (e.g., averaged) and the combined signal used as the steady-state displacement control parameter (e.g., D in FIG. 10). Further, if work vehicle 2 is equipped with leveling sensor 36, the steady-state displacement control parameter can depend on the signal from sensor 36 to maintain a level attitude of cab 6 with respect to the horizontal. For example, if a sensed signal indicates that the front of cab 6 is tilting downward, the displacement of front isolators 28–30 can be increased and the displacement of rear isolator 32 decreased to level the attitude of cab 6. Sideways adjustments can be made when cab 6 is tilting sideways. The changes to the steady-state displacements that are made to control the attitude of cab 6 are limited to a portion of the stroke of piston 72 such that piston 72 retains the ability to provide vibration isolation.

The steady-state height of cab 6 above chassis 4 can also be adjusted manually using cab height command device 234. Further, the height of cab 6 can be lowered to a minimum level in response to an actuation of lower command device 236 (for example, to decrease the clearance required for vehicle 2 to pass beneath an overhang).

The valve control signals may also be coordinated with each other to coordinate the attenuated transmission of force between cab 6 and chassis 4. For example, as explained above, the performance parameters of isolators 28–32 may be adjusted during operation of vehicle 2. It may, however, be undesirable for each isolator 28–32 to have different parameter values. Thus, the parameters of each isolator 28–32 may be adjusted to the same parameter values by, for example, averaging the individually-determined parameter values for each isolator 28–32.

In some work vehicle applications, the control signals applied to air control valves 206 are coordinated with each other to coordinate control of air springs 44. As described above, the air pressure within each spring 44 can be actively controlled to just support the static weight of cab 6 on each isolator 28–32 so that actuators 68 are able to move cab 6 with minimal power consumption. However, the total weight of cab 6 may change due to, for example, changes in weight of the operator or operators, or storage or removal of objects (e.g., tools). Further, even assuming a constant total cab weight, the relative weight of cab 6 on isolators 28–32 depends on the slope of surface 12, regardless of whether vehicle 2 is still or is moving. For example, when vehicle 2 is on a slope, the weight supported by a downward isolator increases and the weight supported by an upward isolator decreases. Without adjustment, the air pressure in each spring 44 will no longer be correct, and actuator 68 will consume extra power to counteract the changed effective weight.

Changes in load force exerted on each isolator 28–32 due to a change in total weight of cab 6 are accommodated by sensing load force on each isolator 28–32, summing the signals to determine a total load force, and distributing the total load force among isolators 28–32 using a known formula based upon the configuration of isolators 28–32. For example, if total load force corresponds to a weight of 2000 pounds, ASC 200 may attribute 500 pounds to each front isolator 28–30 and 1000 pounds to rear isolator 32. The air pressure in the respective springs 44 would then be set to support these weights. Thus, the load forces will be distributed correctly even if vehicle 2 is on a steep grade when the measurements of load force are taken (which would cause incorrect results if the air pressure of each isolator 28–32 was set independently based upon the sensed load force of that isolator). Total load force is preferably sensed when vehicle 2 is still (e.g., at power-on or when vehicle velocity is 0) to prevent movements of cab 6 from affecting the sensed signals.

Changes in the relative weight of cab 6 on each isolator due to changes in ground slope during operation are accommodated by distributing the total load force of cab 6 (determined on power-on or when vehicle velocity is 0) to isolators 28–32 in one of two manners. (Note that the absolute load signals generated by sensors 144 may be inaccurate when vehicle 2 is moving.) First, the total load force can be distributed among isolators 28–32 based on the attitude of cab 6 sensed by leveling sensor 36. For example, if the front of cab 6 is tilted downward, the air pressure in front isolators 28–30 is increased and the air pressure in rear isolator 32 is decreased. Second, the load signals from isolators 28–32 can be summed and the total load force (measured when vehicle 2 was still) distributed to each isolator 28–32 based upon the relative contribution to the summed signal of that isolator's load signal. The air control signals for each isolator 28–32 are then generated based upon the distributed load force.

Thus, by coordinating the air control signals to distribute the total load force among isolators 28–32, changes in weight of cab 6 are accommodated accurately even when vehicle 2 is on a sloped surface or moving.

When work vehicle 2 is equipped with a vehicle data bus, ACS 26 communicates via the bus with other vehicle systems having parameters related to forces which will be applied or are being applied to vehicle 2. Movement of cab 6 due to such forces is attenuated by appropriate control of isolators 28–32 as explained below. Control input signals from such other vehicle systems are supplemental inputs for ACS 26, and the acceleration signals remain the primary control inputs.

Figure 11:
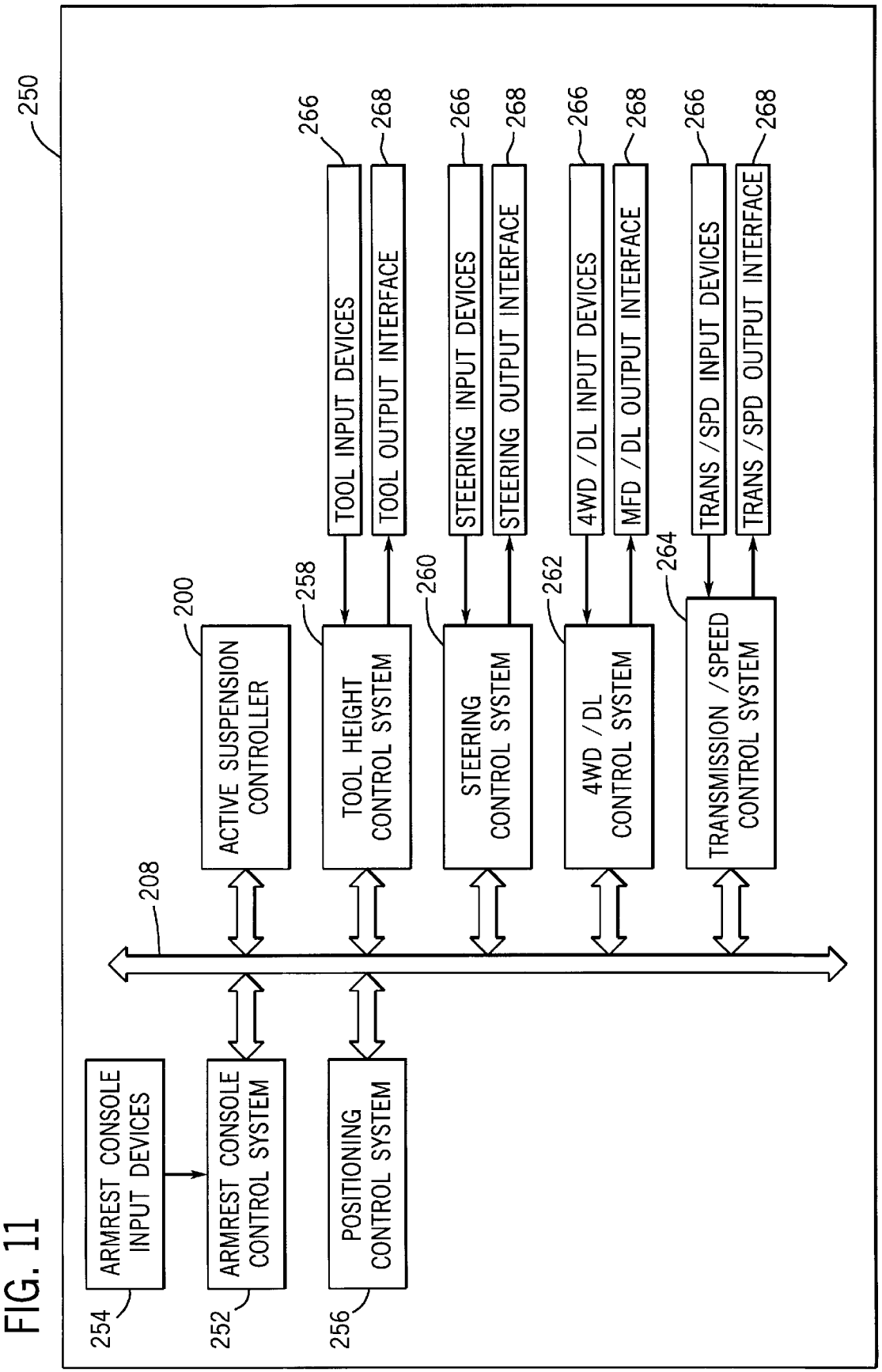
FIG. 11 is a schematic block diagram representing interconnections across a vehicle data bus between the active suspension controller and other vehicle systems.

Referring to FIG. 11, an exemplary vehicle control system 250 shows vehicle 2 equipped with ASC 200 and with other vehicle control systems in communication with each other via bus 208. Vehicle control system 250 includes an armrest console control system 252 coupled to armrest console input devices 254 to receive command signals, and a positioning control system 256 to receive positioning signals representing locations of vehicle 2. Although command devices 232–238 are wired to ASC 200 in FIG. 9, these command devices may also be located in the armrest console where they are read by control system 252.

Control system 250 includes other vehicle systems having parameters related to forces applied to vehicle 10. For example, control system 250 may include a tool height control system 258, a steering control system 260, a four-wheel drive/differential lock (4WD/DL) control system 262, and a transmission and speed control system 264. Each system 258–264 includes input devices 266 to generate command signals and output interfaces 268 to control output actuators. Vehicle 2 may be equipped with any or all of these systems (e.g., a tractor equipped with tool height control system 258 may not have an armrest control console coupled to bus 208). Vehicle 2 may also include other vehicle systems having parameters related to forces applied to vehicle 2. Communication of parameters related to forces applied to vehicle 2 across bus 208 gives ASC 200 access to such parameters without the need for separate sensors dedicated to ACS 26.

In one embodiment, tool height control system 258 is installed on a tractor equipped with a hitch assembly to raise and lower a tool (e.g., implement or plow). Input devices 266 include draft force and position command devices used by control system 258 to generate control signals applied to an actuator to raise and lower the tool. Sensors provide draft force and position feedback signals. The command signals generated by input devices 266 are indicative of draft forces which will be applied to the tractor, and the feedback signals are indicative of draft forces currently being applied to the tractor. Thus, the command signals and feedback signals are both related to draft forces applied to the tractor. A hitch assembly control system for a tractor having the above components is described in U.S. Pat. No. 5,421,416. In another embodiment, tool height control system 258 is installed on a combine equipped with a positioning assembly which raises and lowers a header. A header control system for a combine is described in U.S. Pat. No. 5,455,769. The '416 and '769 patents are commonly assigned and herein incorporated by reference.

Steering control system 260 includes a steering input device 266 (e.g., steering wheel 20) coupled to a sensor (e.g., sensor 38) which generates steering angle command signals indicating the degree of turning. A feedback sensor can be used to measure actual turning. The sensed signals are indicative of the normal forces applied to vehicle 10 due to turning since steering angle is a measure of turning radius, and normal force equals velocity squared divided by radius. Velocity is sensed by a ground speed sensor such as sensor 338. A steering control system is disclosed in U.S. Pat. No. 5,194,851, commonly assigned and herein incorporated by reference.

An exemplary 4WD/DL control system 262 is described in U.S. Pat. No. 5,505,267, commonly assigned and herein incorporated by reference. Control system 262 includes 4WD/DL input devices 266 and output interfaces 268, and has parameters indicative of command and output signals for a 4WD clutch and DL lock related to forces applied to vehicle 2 as 4WD is engaged and disengaged and DL is locked and unlocked. The '267 patent further discloses brake detecting circuits (e.g., circuits 39) coupled to the brakes (e.g., brakes 24) of a vehicle to generate signals representing the state of the brakes and, thus, whether braking forces are being applied to vehicle 2.

An exemplary transmission/speed control system 264 is described in U.S. Pat. No. 5,233,525, also commonly assigned and incorporated herein by reference. Control system 264 includes gear shift and speed input devices 266 and output interfaces 268. Control system 264 has parameters indicative of commanded and output gear shift signals of a transmission, and commanded and output speed actuator settings. These parameters are related to the forces applied to vehicle 2 as the transmission upshifts and downshifts and vehicle 2 accelerates and decelerates.

ASC 200 has access via bus 208 to parameters of the other systems shown in FIG. 11 related to forces applied to vehicle 2 during operation of those systems. ASC 200 uses the parameters as supplemental control inputs when generating control signals for isolators 28–32 to attenuate movement of cab 6 due to such forces. For example, if a parameter indicates that a pitch or normal force is about to be applied to vehicle 2 control signals applied to isolators 28–32 will prevent the operator from being thrown backwards or sideways. The gain parameter can also be adjusted when such forces are predicted. Further, the attitude of cab 6 can be changed to improve ride quality in response to such forces (e.g., by tilting cab 6 into a turn, or tilting cab 6 in the fore-and-aft direction in response to a pitch force). In addition, the force parameters from other vehicle systems can be used by ACS 26 as preparatory signals. For example, ACS 26 could bias the oil supply to the isolator 28–32 which will require the most oil flow when the force actually impacts cab 6. Adaptive or predictive control algorithms can use the parameters to predict movement of cab 6 caused by the forces. Fuzzy logic control algorithms may also be used to generate control signals in response to the force parameters to provide improved ride quality. Empirical testing may be used to determine the control algorithms.

Referring to FIG. 12, positioning control system 256 includes a positioning control circuit (PCC) 300 for receiving, processing and communicating site-specific data. PCC 300 is coupled to an interface circuit 302 for communicating across bus 208. PCC 300 also communicates with external systems such as a computer 304 via a memory card 306 which transfers geo-referenced maps including spatially-variable map data indicative of fields, roads and the bumpiness thereof. Card 306 can be a Type II PCMCIA card made by Centennial Technologies, Inc. PCC 300 includes a digital processor and memory. However, dedicated, specific purpose equipment or hard-wired logic circuitry can also be used.

PCC 300 communicates with an operator through a user interface 308 via a bus 310 (e.g., RS-232/485 interface). Interface 308 can include, for example, a graphical user interface 312 providing cursor control (e.g., a mouse, joystick or four-way switch), assignable switches 314 (e.g., push buttons) configurable by PCC 300, a keyboard 316 and a voice interface 318. PCC 300 generates display signals applied to a reconfigurable display 320 (e.g., CRT, flat screen active-matrix LCD) via a bus 322. Display 320 can display, inter alia, the configuration of switches 314. User interface 308 and display 320 are located in cab 14 for easy operator access. PCC 300 may communicate with a printer 324 via an interface 326 (e.g., an RS-232 link).

PCC 300 also communicates with a location signal generation circuit 328 which generates location signals representing the positions of vehicle 2. Circuit 328 includes a global positioning system (GPS) receiver 330 with an associated antenna 332, and a differential GPS (DGPS) receiver 334 with an associated antenna 336. A single antenna may be used in place of antennas 332 and 336. GPS receiver 330 may be made by Trimble Navigation Ltd. of California, and DGPS receiver 334 may be made by Satloc, Inc. of Arizona. GPS receiver 330 determines longitude and latitude coordinates (and altitude) of the vehicle from signals transmitted by the GPS satellite network. Accuracy of the position data is improved by applying correction signals received by DGPS receiver 334. In one embodiment, PCC 300 interfaces with the SATLOC L-Band Integrated TerraStar DGPS System via an RS-485 link.

PCC 300 receives signals representing the ground speed of vehicle 2 from ground speed sensor 338 via interface 340 (e.g., a frequency interface). Ground speed sensor 338 preferably includes a radar device mounted to the body of vehicle 2. However, sensor 338 may also include a magnetic pickup sensor configured to sense the speed of the vehicle's wheels or transmission.

Figures 13, 14:
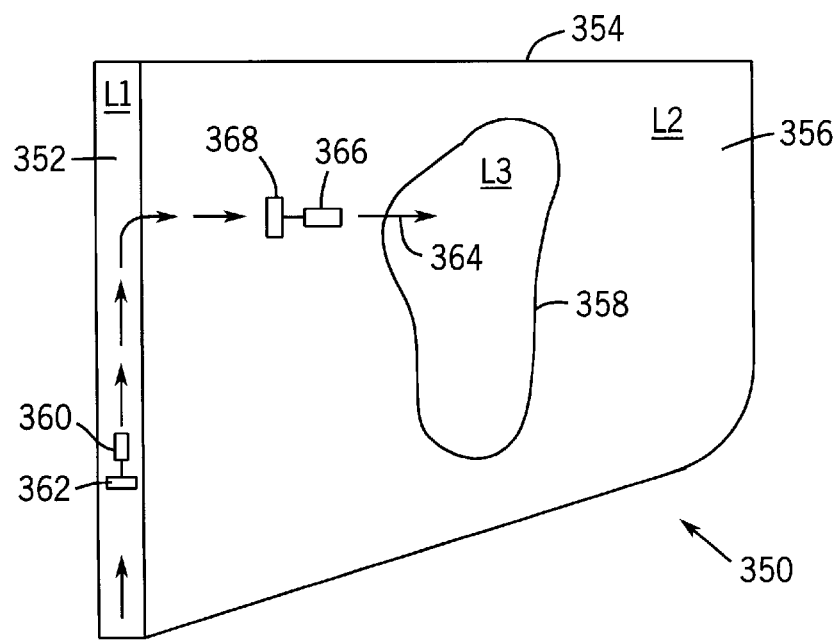
FIG. 13 is a table representing a predetermined geo-referenced map including spatially-variable data indicative of altitudes and bumpiness levels.
FIG. 14 represents a predetermined geo-referenced map of a road and a field which includes bumpiness level data.

Referring to FIG. 13, bumpiness level data used to adjust the performance parameters of ACS 26 may also be determined using vehicle position as an index to geo-referenced maps of surface 12. For example, PCC 300 is provided with predetermined geo-referenced maps or data layers 350 stored on memory card 306. Map 350 is represented by a table wherein rows represent field locations and columns represent the longitude and latitude coordinates, altitude and the bumpiness level for each location. In one embodiment, bumpiness levels are represented using discrete numbers (e.g., level 1=a relatively smooth surface, level 2=a medium surface, level 3=relatively bumpy surface). Other levels may also be defined and real numbers may be used. For example, data point no. 3 indicates that the altitude is 801.0 feet and the surface is relatively smooth at the location defined by latitude and longitude coordinates—88.7290720 and 39.0710740, respectively. Map 350 is preferably implemented using a geographical information systems (GIS) database stored as a DOS file on card 306.

Referring to FIG. 14, a predetermined geo-referenced map 350 of a road 352 and a field 354 which includes bumpiness level data is represented graphically. Road 352 is labeled bumpiness level L1 since it is relatively smooth. One area of field 354 is labeled level L2 since it has medium bumpiness, while a second area 358 of field 354 is labeled as level L3 since it is relatively bumpy. The bumpiness level data stored in map 350 may have been generating during a previous pass of vehicle 2 by storing the signals that were generated by movement sensors 84 (using appropriate filtering). Alternatively, scouting data may have been entered into map 350 using computer 304, or map 350 may distinguish only between smooth areas (e.g., paved roads) and bumpy areas (e.g., fields) in which case bumpiness level data is not needed if it is assumed that roads are smooth and fields are bumpy.

When the vehicle and implement are at positions shown by markers 360 and 362, the vehicle is on road 352 and the expected course of travel shown by arrows 364 indicates that the vehicle is expected to turn into field 354. The current bumpiness level is level L1, and a bumpiness level of L2 is expected after the turn. Similarly, when the vehicle and implement are located at positions shown by markers 366 and 368, the vehicle is in the smoother area of field 354 (level 2) and is about to enter the bumpy area (level 3). PCC 300 can use the current position of the vehicle and geo-referenced map 350 to estimate the bumpiness level that the vehicle will encounter and to adjust the performance parameters of ACS 26 to accommodate changes in the level of bumpiness.

Figure 15:
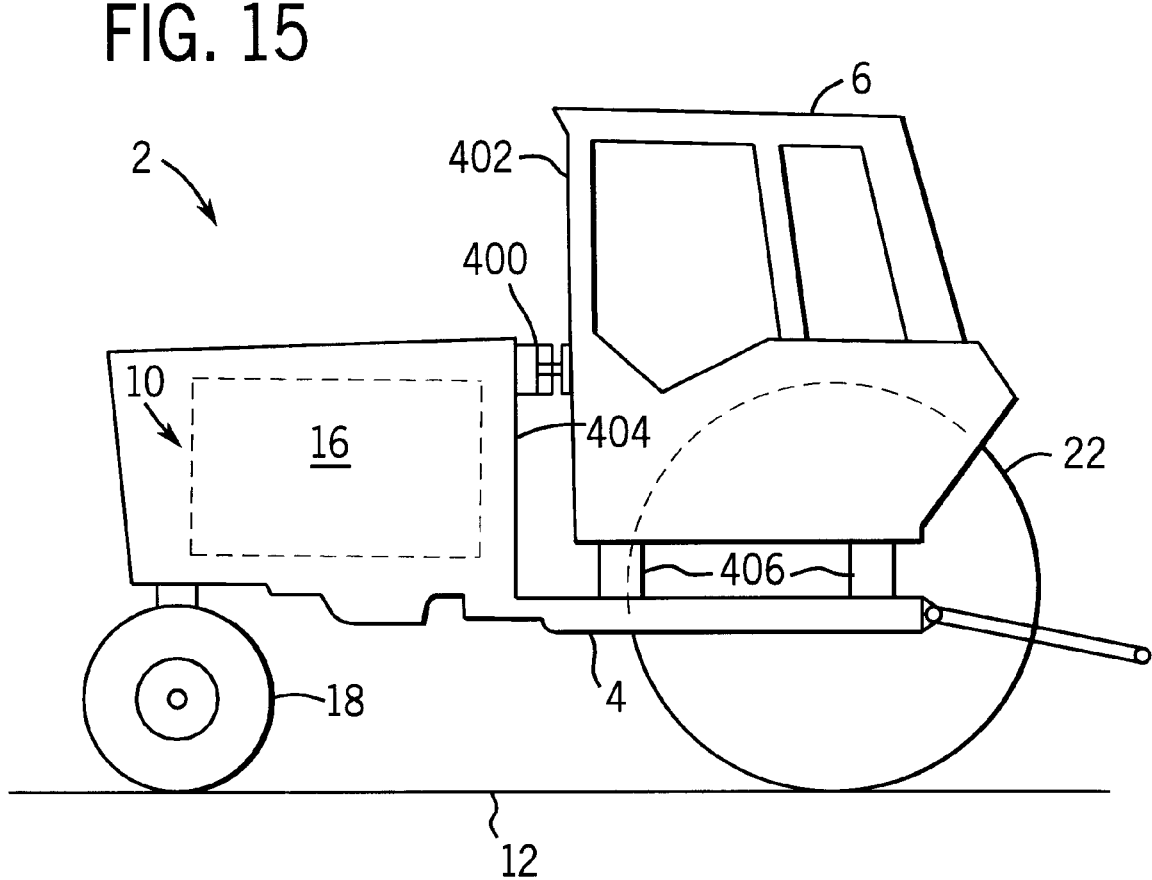
FIG. 15 shows a work vehicle equipped with another embodiment of an active cab suspension system including an active isolator located between a side of the cab and a vertical support member (e.g., engine compartment wall).

Referring to FIG. 15, vehicle 2 is equipped with another embodiment of an active suspension system which includes an active vibration isolator 400 mounted between a side 402 of cab 6 and a support member 404 extending from chassis 4. Active or passive isolators or supports 406 between cab 6 and chassis 4 allow the cab to move in response to actuations of isolator 400.

Isolator 400 may be the same as isolator 28. Since isolator 400 no longer supports the static weight of cab 6, however, spring 44 may be eliminated or have a reduced weight capacity. Eliminating spring 44 eliminates the need for a compressed air source, reduces power used by the system, and reduces cost. To maximize response to cab pitch, isolator 400 is mounted high on side 402 of cab 6. Member 404 may be an engine compartment wall or another vertical support structure securely mounted to chassis 4. Alternatively, member 404 could be oriented along the longitudinal direction of vehicle 2 such that the system is responsive to roll. Isolators 406 may be existing cab mounts. Multiple isolators 400 may be used on side 402 of cab 6 to provide isolation in other axis' such as that provided by bottom-mounted isolators 28–32. Isolator 400 provides control in the longitudinal direction. However, active isolators can also be mounted so as to control movement of cab 6 in the six degrees of freedom.

A particular application of an active suspension system for a work vehicle may use all or a subset of the sensors, actuators and other features and components disclosed above, and may include different combinations of the various alternatives. While the embodiments illustrated in the FIGURES and described above are presently preferred, it should be understood that these embodiments are offered by way of example only. For example, depending upon the application, an air-operated actuator 68 may be used in place of a hydraulic actuator. Furthermore, an application may permit use of an electric (e.g., solenoid-type) actuator. The power sources for these actuators include pressurized hydraulic fluid, pressurized air, and electricity, respectively. Also, active isolators may also be mounted to provide isolation for the six degrees of freedom of the cab. The invention is not limited to any particular embodiment, but extends to various modifications that nevertheless fall within the scope of the appended claims.

What is claimed is:

1. An active suspension system for a work vehicle, the work vehicle including a chassis, an operator's cab disposed above the chassis, and an actuator power source supported by the chassis, comprising:

a plurality of active vibration isolators mounted at a plurality of locations between the cab and the chassis, each active vibration isolator including:

first and second mounts adapted to attach between the cab and the chassis, respectively;

a hydraulic actuator connected between the first and the second mounts and including a cylinder and a piston movable therein;

an actuator control assembly coupled between the power source and the actuator, the actuator control assembly including a hydraulic valve assembly configured to selectively apply and relieve pressurized hydraulic fluid to the actuator in response to an actuator control signal to cause the piston to move in a given direction relative to the cylinder, thereby causing the cab to move relative to the chassis; and a sensor configured to generate a sensed signal representative of a parameter of actuator motion in the given direction;

an operator-actuatable command device for generating a command signal; and control circuit coupled to the plurality of active vibration isolators and to the command device, the control circuit configured to generate the plurality of actuator control signals in response to the plurality of sensed signals and to the command signal, wherein the plurality of actuator control signals are coordinated with each other to coordinate control of the active vibration isolators, and wherein operator actuations of the command device selectively affect the coordinated control.

2. The active suspension system of claim 1 wherein each active vibration isolator further includes a spring connected between the first and the second mounts to support the static weight of the cab.

3. The active suspension system of claim 1 wherein the sensed signal of each active vibration isolator is representative of displacement between the first and the second mounts, and the plurality of actuator control signals are generated to coordinate control of the displacements between the first and the second mounts.

4. The active suspension system of claim 3 further comprising a leveling sensor coupled to the control circuit and configured to generate a leveling signal representative of a degree to which the attitude of the cab is level relative to horizontal, and the actuator control signals are generated to increase the degree to which the attitude of the cab is level.

5. The active suspension system of claim 1 wherein the command device is a cab height command device, and the actuator control signals are generated to adjust the steady-state height of the cab above the chassis in response to the command signal, the steady-state height of the cab above the chassis being determined by the movement of the pistons relative to the cylinders.

6. The active suspension system of claim 1 wherein the command device is a cab lower command device, and the actuator control signals applied to the hydraulic valve assemblies are generated to move the cab to a minimum height above the chassis in response to the command signal.

7. The active suspension system of claim 1 wherein the sensed signal of each active vibration isolator is representative of movement in the given direction of the cab due to disturbances in the chassis, and the actuator control signals are generated to coordinate attenuated transmission of force between the cab and the chassis.

8. The active suspension system of claim 7 wherein at least one performance parameter of the active vibration isolators is coordinated with each other to coordinate the attenuated transmission of force.

9. The active suspension system of claim 1 wherein the plurality of active vibration isolators includes two front and only one rear active vibration isolators, the front isolators disposed on either side of a longitudinal axis of the work vehicle and the rear isolator disposed substantially along the axis.

10. The active suspension system of claim 1 wherein the control circuit includes a digital processor coupled to a memory circuit, the digital processor configured to execute a sequence of steps stored in the memory circuit.

11. An active suspension system for a work vehicle, the work vehicle including a chassis, an operator's cab disposed above the chassis, and an actuator power source supported by the chassis, comprising:

a plurality of active vibration isolators mounted at a plurality of locations between the cab and the chassis, each active vibration isolator including:
first and second mounts adapted to attach between the cab and the chassis, respectively;
an actuator connected between the first and the second mounts;
an actuator control assembly coupled between the power source and the actuator, the actuator control assembly configured to selectively apply power to the actuator in response to an actuator control signal to cause the actuator to move the cab in a given direction relative to the chassis; and
a sensor configured to generate a sensed signal representative of a parameter of actuator motion in the given direction;
an operator-actuatable command device for generating a command signal; and
a control circuit coupled to the plurality of active vibration isolators and to the command device, the control circuit configured to generate the plurality of actuator control signals in response to the plurality of sensed signals and to the command signal, wherein the plurality of actuator control signals are coordinated with each other to coordinate control of the active vibration isolators, and wherein operator actuations of the command device selectively affect the coordinated control;
wherein the command device is a cab rate command device, and the actuator control signals are generated to maintain the cab at a substantially constant attitude while moving the cab at a rate selected by the command signal.

12. The active suspension system of claim 11 wherein the actuator control signals are generated to move the cab between a power-down and an operating position at the selected rate on power-up.

13. The active suspension system of claim 11 wherein the actuator control signals are generated to move the cab between an operating and a power-down position at the selected rate on power-down.

14. An active suspension system for a work vehicle, the work vehicle including a chassis, an operator's cab disposed above the chassis, and a pressurized air source supported by the chassis, comprising:

a plurality of active vibration isolators mounted at a plurality of locations between the cab and the chassis, each active vibration isolator including:
first and second mounts adapted to attach between the cab and the chassis, respectively;
an air spring connected between the first and the second mounts;
an air valve assembly coupled between the pressurized air source and the air spring, the air valve assembly configured to selectively supply and relieve a flow of pressurized air to the air spring in response to an air valve control signal to cause a change in pressure within the air spring;
an actuator connected between the first and the second mounts and configured to selectively move the cab in a given direction relative to the chassis in response to an actuator control signal;
a first sensor configured to generate a first signal indicative of movement in the given direction of the cab due to disturbances in the chassis; and
a second sensor configured to generate a second signal indicative of a load force exerted by the cab on the active vibration isolator; and
a control circuit coupled to the plurality of active vibration isolators, the control circuit configured to generate the plurality of actuator control signals in response to the first signals to attenuate transmission of force between the cab and the chassis, to determine a total load force by summing the second signals and to generate the plurality of air valve control signals in response to the second signals to control the pressure in the air springs to distribute the total load force among the air springs, wherein the plurality of air valve control signals are coordinated with each other.

15. The active suspension system of claim 14 wherein the total load force is determined when the work vehicle is not moving.

16. The active suspension system of claim 15 further comprising a third sensor configured to generate a third signal indicative of a degree to which attitude of the cab is level relative to horizontal, wherein the air valve control signals are generated using the third signal when distributing the total load force to account for changes in load force on each active isolator.

17. The active suspension system of claim 15 wherein a plurality of pressure sensors are configured to generate a plurality of signals representing pressure in each of the plurality of air springs, and each air valve control signal is generated to control the pressure in a closed-loop using the respective pressure signal.

18. The active suspension system of claim 14 wherein the control circuit includes a digital processor coupled to a memory circuit, the processor configured to execute a sequence of steps stored in the memory circuit.

19. An active suspension system for a work vehicle, the work vehicle including a chassis, an operator's cab disposed above the chassis, and an actuator power source supported by the chassis, comprising:

a plurality of active vibration isolators mounted at a plurality of locations between the cab and the chassis, each active vibration isolator including:
first and second mounts adapted to attach between the cab and the chassis, respectively;
an actuator connected between the first and the second mounts;
an actuator control assembly coupled between the power source and the actuator, the actuator control assembly configured to selectively apply power to the actuator in response to an actuator control signal to cause the actuator to move the cab in a given direction relative to the chassis; and
a sensor configured to generate a sensed signal representative of displacement between the first and the second mounts; and
a control circuit coupled to the plurality of active vibration isolators and configured to generate the plurality of actuator control signals in response to the plurality of sensed signals, the actuator control signals coordinated with each other to coordinate control of the displacements between the first and the second mounts and, on power-up, to maintain the cab at a substantially constant attitude while moving the cab between a power-down position and an operating position at a predetermined rate.

20. An active suspension system for a work vehicle, the work vehicle including a chassis, an operator's cab disposed above the chassis, and in actuator power source supported by the chassis, comprising:

a plurality of active vibration isolators mounted at a plurality of locations between the cab and the chassis, each active vibration isolator including:

first and second mounts adapted to attach between the cab and the chassis, respectively;

an actuator connected between the first and the second mounts;

an actuator control assembly coupled between the power source and the actuator, the actuator control assembly configured to selectively apply power to the actuator in response to an actuator control signal to cause the actuator to move the cab in a given direction relative to the chassis; and a sensor configured to generate a sensed signal representative of displacement between the first and the second mounts; and a control circuit coupled to the plurality of active vibration isolators and configured to generate the plurality of actuator control signals in response to the plurality of sensed signals, the actuator control signals coordinated with each other to coordinate control of the displacements between the first and the second mounts and, on power-down, to maintain the cab at a substantially constant attitude while moving the cab between an operating and a power-down position at a predetermined rate.

* * * * *